United States Patent [19]

Wells et al.

[11] Patent Number: 5,022,755
[45] Date of Patent: Jun. 11, 1991

[54] PHOTODIODE CONFIGURATIONS FOR SIMULTANEOUS BACKGROUND CORRECTION AND SPECIFIC WAVELENGTH DETECTION

[75] Inventors: Gregory J. Wells, Suisun; Barbara A. Bolton, Albany, both of Calif.

[73] Assignee: Varian Associates, Inc., Palo Alto, Calif.

[21] Appl. No.: 349,200

[22] Filed: May 9, 1989

[51] Int. Cl.[5] .................................................. G01J 3/36
[52] U.S. Cl. ..................................... 356/307; 356/328
[58] Field of Search ......................... 356/307, 328, 310

[56] References Cited

U.S. PATENT DOCUMENTS

| | | | |
|---|---|---|---|
| 3,819,945 | 6/1974 | Egan et al. | 356/307 X |
| 4,674,880 | 6/1987 | Seki | 356/328 |
| 4,820,048 | 4/1989 | Barnard | 356/328 |

FOREIGN PATENT DOCUMENTS 1075033  4/1980  Canada.
0148086  9/1987  European Pat. Off. .

OTHER PUBLICATIONS

R. K. Skogerboe et al., "A Dynamic Background Correction System for Direct Reading Spectrometry", Appl. Spectrosc. 30, 495–500 (1976).
B. E. Weekley et al., "A Versatile Electronic Computer for Photoelectric Spectrochemical Analysis", Appl. Spectrosc. 18, 21 (1964).
W. Snelleman et al., "Flame Emission Spectrometry with Repetitive Optical Scanning in the Derivative Mode", Anal. Chem. 42, 394–398 (1970).
S. A. Estee et al., "Microwave-Excited Atmospheric Pressure Helium Plasma Emission Detection Characteristics in Fused Silica Capillary Gas Chromatography", Anal. Chem. 53, 1829–1837 (1981).
G. M. Levy et al., "A Photodiode Array Based Spectrometer System for Inductively Coupled Plasma-Atomic Emission Spectrometry", Spectrochim Acta 428, 341–351 (1987).

Primary Examiner—Vincent P. McGraw
Attorney, Agent, or Firm—Stanley Z. Cole; David Schnapf

[57] ABSTRACT

In a spectrophotometer having photodetectors positioned at fixed wavelengths, the photodetector is divided into three subdetectors, a main subdetector on the wavelength of interest and two background subdetectors located on each side of the main subdetector, the background subdetectors together having area equal to that of the main subdetector, the background subdetectors being connected in polarity reverse that of the main subdetector to correct for changes in background radiation.

4 Claims, 5 Drawing Sheets

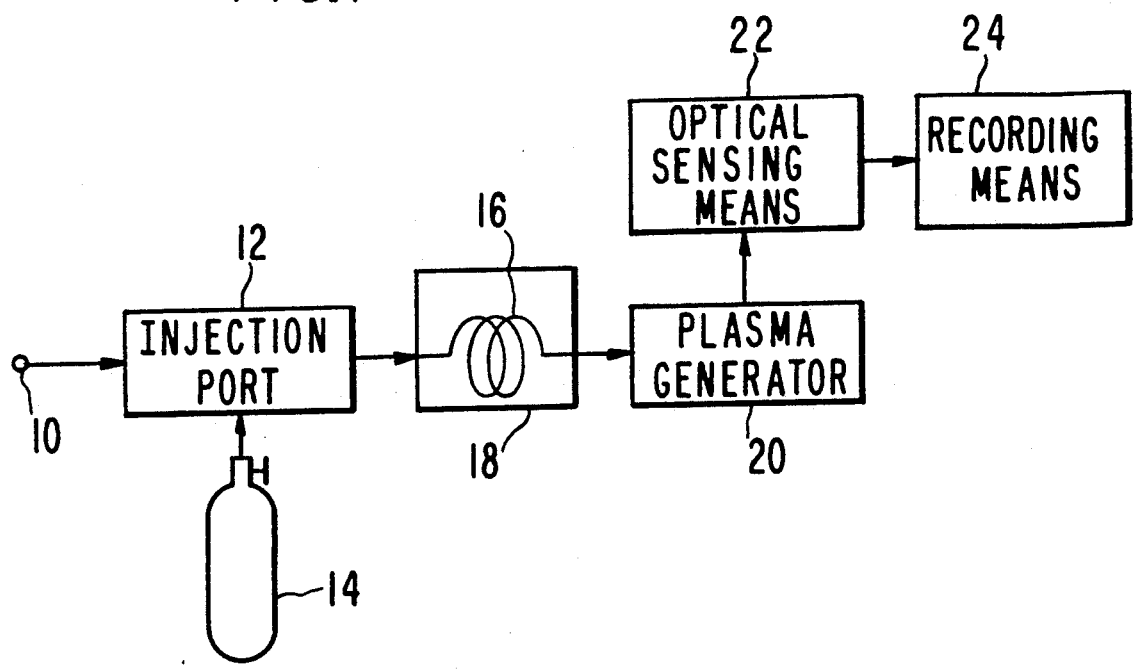
FIG. 1
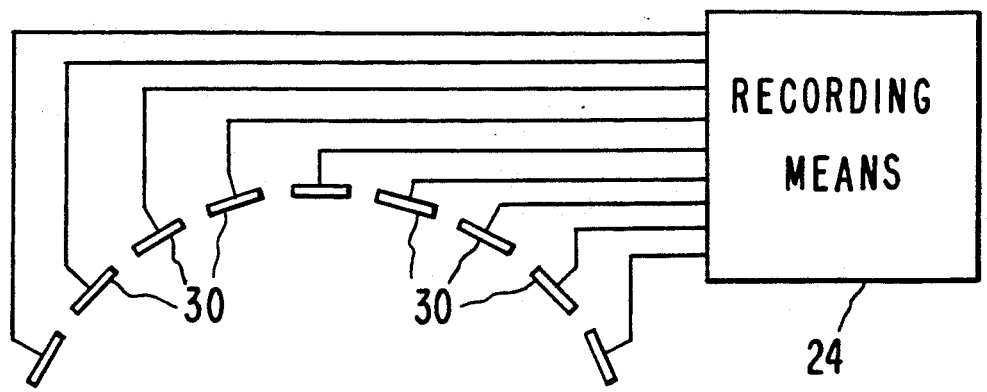
FIG. 2
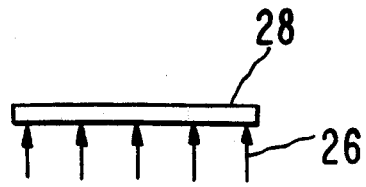

PHOTODIODE CONFIGURATIONS FOR SIMULTANEOUS BACKGROUND CORRECTION AND SPECIFIC WAVELENGTH DETECTION

FIELD OF THE INVENTION

This invention pertains to a method and apparatus for radiation detection combined with simultaneous background correction.

BACKGROUND OF THE INVENTION

In gas chromatography a sample of interest is volatilized and injected into a gas chromatography column, typically housed in an oven. A carrier gas flows constantly through the column sweeping the sample along with it. Differential adsorption and desorption of the sample constituents on the partition medium in the column separates the sample into its components. Having been thus separated, the constituents of the sample elute from the column at different times and flow to a detector which continuously measures one or more properties of the gas eluting from the column. A change in the properties being measured relative to the baseline property of the carrier gas signifies that a sample constituent is passing through the detector. This is commonly referred to as a "peak". A recording of the detector signal, which may contain a large number of peaks, is called a chromatogram.

A variety of detectors are available to the chromatographer. The selection of what type of detector to use is a function of a variety of factors including the type(s) of samples being investigated, cost, sensitivity, selectivity and others. Some detectors respond well to a broad variety of sample species while others are useful for only specific types of compounds.

Other type of detector which has gained increasingly widespread attention for use in gas chromatography is the plasma emission detector. In a plasma emmission detector sample from the GC column is introduced into a high temperature atmospheric pressure plasma where the sampled molecules are broken up by action of the thermal energy into atomic species and ionized. As the atoms in the plasma undergo engergy transitions they emit characteristic light spectra which are detected by light sensors, typically photodiodes. Sample identification can be made by monitoring the wavelengths and intensities of the light emitted from the plasma. The plasma emission detector has been shown to be a highly sensitive universal detector.

In the prior art, the use of photodiodes to correct background changes has consisted of using two separate photodetector packages, with one designated as a reference. Typically, the two signals were digitized, stored in a computer, and with appropriate attenuation the reference signal was subtracted to the signal of interest. (See: R.K. Skogerboe et al., A Dynamic Background Correction System for Direct Reading Spectrometry, *Appl. Spectrosc.* 30, 495-500 (1976); B.E. Weekley et al., A Versatile Electronic Computer for Photoelectric Spectrochemical Analysis, *Appl. Spectrosc.* 18, 21 (1964).)

Another form of prior art background correction utilizes a single detector in which the wavelength of interest and the background wavelength are alternatively focussed on the detector. The means to accomplish this could be to translate the entrance slit, tilting the grating, or the use of a refractor plate. The resulting modulated signal can be synchronously detected. The result is a signal that is proportional to the difference between the signals at the two wavelengths (signal & background—background). (See: W. Snelleman et al., Flame Emission Spectrometry with Repetitive Optical Scanning in the Derivative Mode, *Anal. Chem.* 42, 394-398 (1970) and S.A. Estee et al., Microwave-Excited Atmospheric Pressure Helium Plasma Emission Detection Characteristics in Fused Silica Capillary Gas Chromatography, *Anal. Chem.* 53, 1829-1837 (1981).)

Another form of prior art background correction utilizes a diode array. The wavelength of interest falls on one or more elements of the array, while the background light at adjacent wavelenghts fall on array elements on both sides. The array is then scanned, digitized, and the background sustracted. (See: G. M. Levy et al., A Photodiode Array Based Spectrometer System for Inductively Coupled Plasma-Atomic Emission Spectrometry, *Spectrochim Acta* 42B, 341-351 (1987).)

Prior art requires using two or more electrometers; two or more signals to be digitized, stored and manipulated to acquire a spectrum free of background fluctuations. However, positioning a reference diode close to the signal of interest or in a position where background fluctuations are representative of changes at the wavelength of interest may be difficult or impossible.

A further disadvantage of prior art devices is the increase in noise due to the additional random noise sources in the readout electronics that follow the diodes. Both wavelength modulation and diode arrays have the additional limitation of signal bandwidth or readout time, which would limit the noise bandwidth that could be compensated for.

OBJECTIVES OF THE INVENTION

It is therefore a primary objective of the present invention to provide light detection means in a spectrophotometer which provides a signal corrected for background without subsquent signal manipulation.

SUMMARY OF THE INVENTION

These objects of the invention and other objects, features and advantages to become apparent as the specification progresses are accomplished by the invention according to which, briefly stated, in a spectrophotometer having photodetectors positioned at fixed wavelengths, dividing the photodetector into three subdetectors, a main subdetector on the wavelength of interest and two background subdetectors located on each side of the main subdetector, the background subdetectors together having area equal to that of the main subdetector, the background subdetectors being connected in polarity reverse that of the main subdetector.

LIST OF ADVANTAGES OF THE INVENTION

An important advantage of the present invention is in the three element diode configuration the placement of reference diodes on either side of the signal of interest (within microns) has shown to greatly minimize or eliminate background changes at the wavelength of interest. This invention requires less electronic components (i.e. electrometers), less computer storage or manipulation and requires less time to acquire the same information than the two separate diode packages. Furthermore this invention can produce a background corrected signal that can be observed in real time.

Since the fluctuations in the light occur simultaneously, the noise sources that are correlated in time and within the wavelength range covered by the diodes, are eliminated; leaving only those that are random. Since the greatest source of random noise (in low light level application) is due to the electrometer, the elimination of one or more electrometer readout devices will further reduce drift caused by temperature variations.

These and further objectives, constructional and operational characteristics, and advantages of the invention will no doubt be more evident to those skilled in the art from the detailed description given hereinafter with reference to the figures of the accompanying drawings which illustrate a preferred embodiment by way of non-limiting example.

BRIEF DESCRIPTION OF THE DRAWINGS

FIG. 1 is a schematic diagram of a gas chromatography apparatus.

FIG. 2 is a schematic diagram of a different spectrometer used as an optical sensing means in a gas chromatography apparatus.

GLOSSARY

Figure 3:
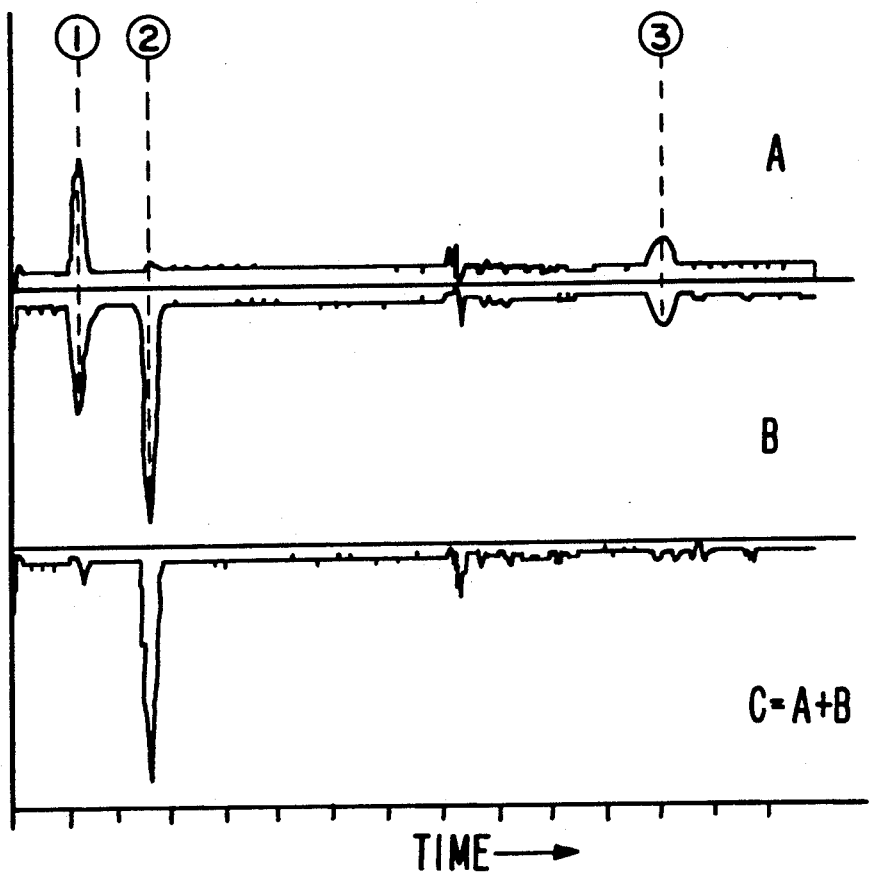
FIG. 3 shows three chromatograms which demonstrate a method of background correction as known in the prior art; chromatogram A shows a measurement of the background; chromatogram B shows the signal with background; chromatogram C shows the addition of A and B to reduce the background; peak (1) is iso-octane and silicon, peak (2) is BSTFA (which is Bis(trimethylsilyl)trifluoroacetamide) and peak (3) is $C_{14}H_{30}$.

The following is a glossary of elements and structural members as referenced and employed in the present invention.

10 sample input to gas chromatography apparatus
12 injection port
14 carrier gas
16 gas chromatography column
18 oven housing column
20 plasma generating means
22 optical sensing means
24 recording means
26 incident radiation from plasma generating means
28 diffraction grating
30 photodetectors
41,42,43 photodiodes used in the sensor of the invention
44 dielectric isolation
45 substrate
50,52 photodiodes
54,56,58 slits in mask

DESCRIPTION OF THE PREFERRED EMBODIMENTS

FIG. 1 is a schematic diagram of a gas chromatography system employing a plasma emission detector. A sample 10 is introduced into an injection port 12 where is mixed with a carrier gas 14 and swept into column 16 housed in oven 18. After the sample is broken down into its constituents by action of the column 16, it flows into a plasma contained within plasma generating means 20. Optical sensing means 22, for example a spectrophotometer, monitor the light emitted from the plasma as the sample flows into the plasma and emits spectra characteristic of the atomic composition of the sample materials. The prior art optical sensing means 22 useful for this purpose are well known to those skilled in the art. Information sensed by the optical sensing means 22 is transmitted to data storage/recording means 24. Data storage/recording means 24 can take a variety of forms well known in the art, from a chart recorder to a personal computer.

As depicted in FIG. 1 the optical sensing means 22 may be located to view the plasma emissions from the side, through a viewing port in the plasma generating means 20, i.e., perpendicular to the axis of the plasma confinement tube (not shown in FIG. 1). Alternately, the optical sensing means 7 may be aligned so that it is coaxial with the bore of the plasma confinement tube.

As shown in FIG. 2, optical sensing means 22 can comprise a diffraction grating 28 receiving incident light 26 from plasma generating means 20 and passing diffracted light to an array of photodetectors 30 positioned to monitor wavelenths of interest.

The chromatogram (A) of FIG. 3 illustrates how a reference diode in the prior art monitors background changes associated with three hydrocarbons entering a plasma. In chromatogram (B), a second diode is monitoring the signal of interest, which is an emission line of silicon. Furthermore, the reference diode is concurrently monitoring changes in the background. Computer addition of (A) and (B) gives chromatogram (C) that minimizes or eliminates peaks due to background changes and the resulting peaks are due to silicon compounds (two peaks for this case).

Figure 5:
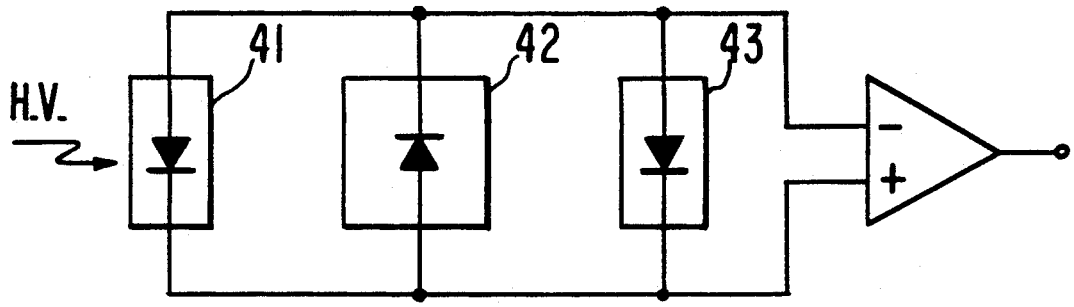
FIG. 5 shows a schematic diagram of the invention in which photodiodes 41 and 43 are on either side of photodiode 42, the area on 41 and 43 being the same and the area of 42 being twice that of 41.

The photodiode detector in a preferred embodiment consists of three discrete elements on a single substrate with the circuit having the general configuration shown in FIG. 5. Photoelements 41 and 43 are connected in a reverse configuration (relative to element 42) and will have equal areas. The area of photoelement 42 will be twice of element 41.

Figure 4:
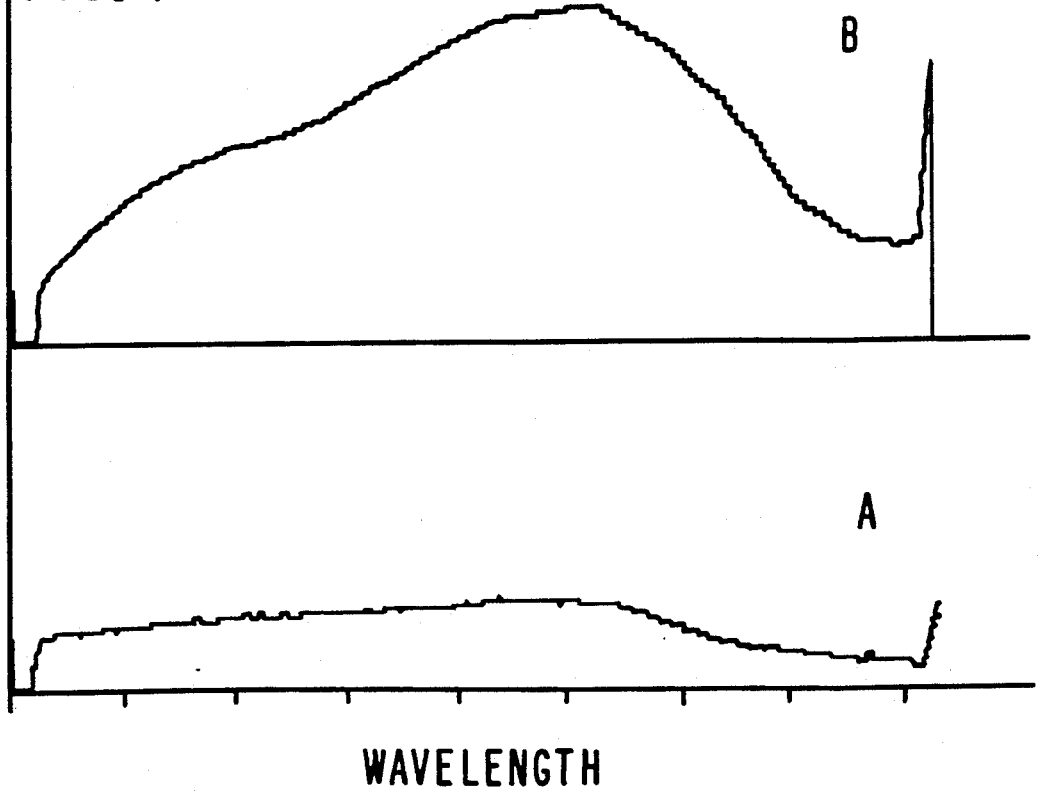
FIG. 4 shows the effect of butane on background; spectrum (A) is background without butane; spectrum (B) is background with butane; the diagram is 22 Angstroms wide centered on 2882 Angstroms.

The general purpose of this invention is that of a photodiode configuration that will correct background (or continuum) changes in the vicinity of an emission signal of interest. Hot, luminous mediums such as plasma or flames generate a continuous spectrum (background) which may be momentarily varied by a number of parameters such as power or gas flow fluctuations, noise or sample introduction. A portion of spectral region generated by a plasma with the presence of butane (B) and without butane (A) is shown in FIG. 4. The presence of butane causes a fivefold increase in background levels across a substantial wave band.

Figure 6:
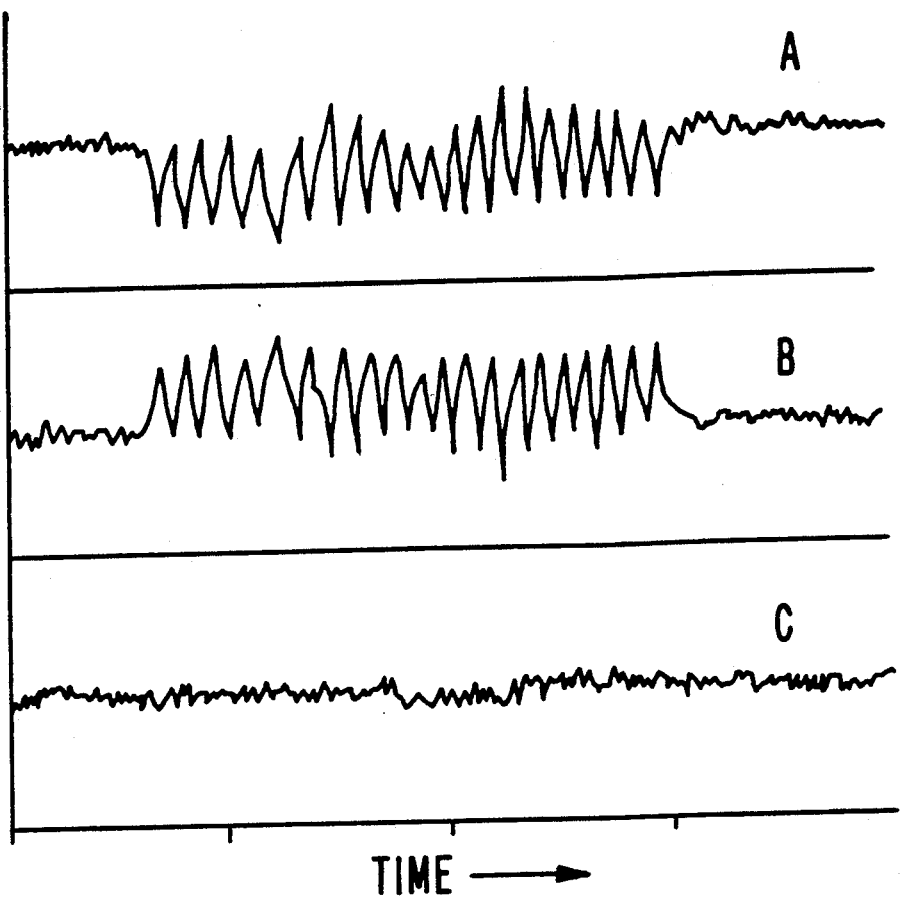
FIG. 6 shows the effect of power fluctuations on the plasma power supply; chromatogram (A) shows the output from photodiodes 41 and 43 which is opposite and equal to the output of photodiode 42 as shown in chromatogram (B); chromatogram (C) shows the effect of computer addition of chromatograms (A) and (B).
Figure 7:
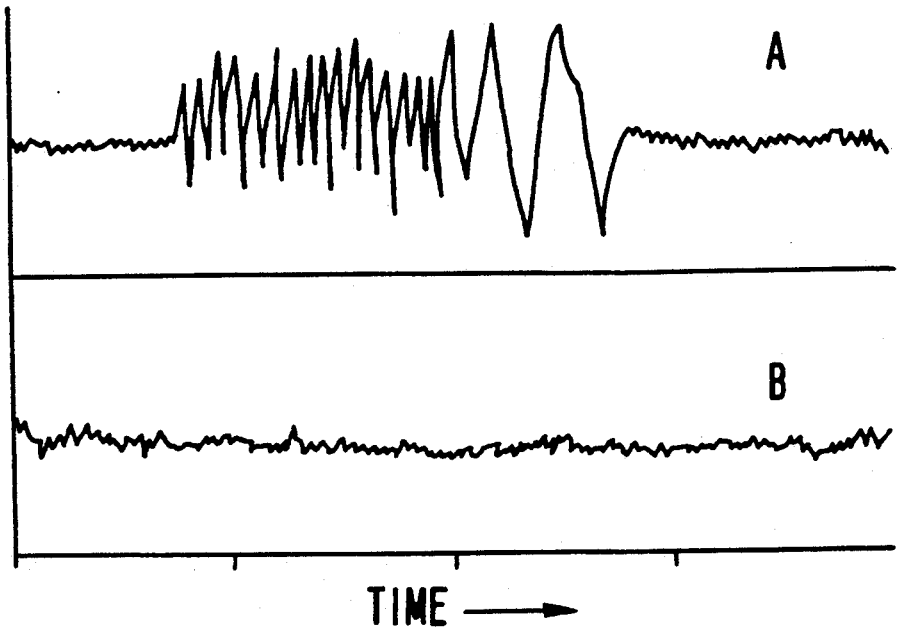
FIG. 7 shows the signal from photodiodes 41 and 43 on chromatogram (A) during power fluctuation on the power supply; chromatogram (B) shows the signal from the combination of photodiodes 41 and 43 with photodiode 42 in a reverse configuration as shown in FIG. 5. The output signals of the diodes are added together prior to the input to the electrometer.

The effects of power fluctuations on background are shown in FIGS. 6 and 7. These perturbations may generate either positive or negative signals.

The purpose of this invention is to electronically reduce or eliminate continuum fluctuations/interferences with the signal of interest.

To illustrate how this configuration works, a plasma generated light source was equally dispersed on the elements of photodiode of the present invention shown in FIG. 5 and the plasma power supply was varied (FIGS. 6 and 7). Chromatogram (A) of FIGS. 6 and 7 shows the output signal from elements 41 and 43 which is opposite and equal to the output signal of element 42 (chromatogram (B) of FIG. 6). Chromatogram (C) in FIG. 6 shows the result of computer additions of chromatograms (A) and (B) of FIG. 6. When the output signals of the diodes are added together prior to input to the electrometer as in FIG. 5, the net effect is a nulling of background fluctuations generated by the power supply as shown in chromatogram (B) of FIG. 7. The only requirement for complete correction is that the background change vary linearly from the wavelength at element 41 to the wavelength at element 43. By eliminating the two separate amplifiers needed in the prior art the net noise resulting is much lower.

Figure 8:
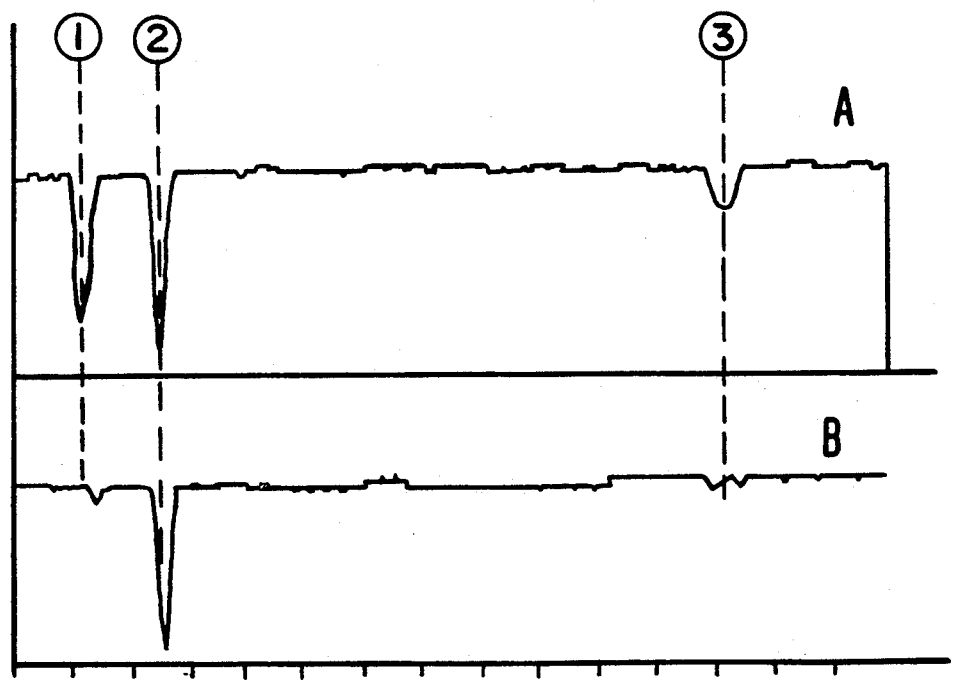
FIG. 8 shows in chromatogram A the background with silicon line as detected at photodiode 42 of the invention in chromatogram (A) and the resulting corrected output signal of the three diodes as shown in FIG. 5 in chromatogram (B).

An important advantage of the present invention is in the three element diode configuration. The placement of reference diodes on either side of the signal of interest (within microns) has been shown to provide a mechanism to greatly minimize or eliminate background changes at the wavelength of interest (FIG. 8). This invention requires less electronic components (i.e. electrometers), less computer storage or manipulation and requires less time to acquire the same information than the two separate diode packages. Furthermore this invention can produce a background corrected signal that can be observed in real time.

Figure 10:
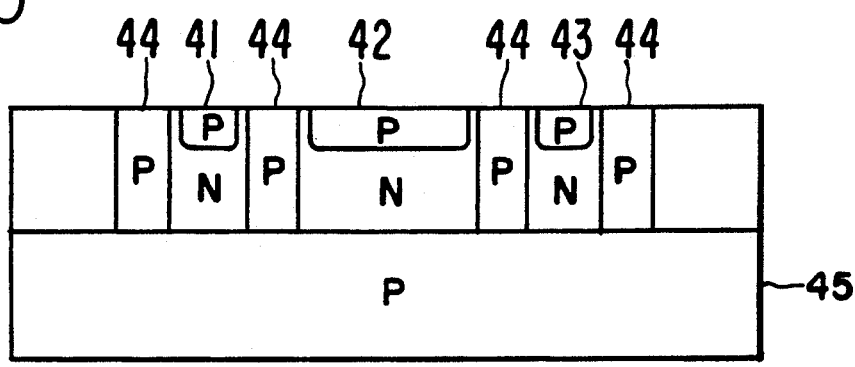
FIG. 10 shows the detector according to the invention in an embodiment of three photodiodes formed on the same die.
Figure 9:
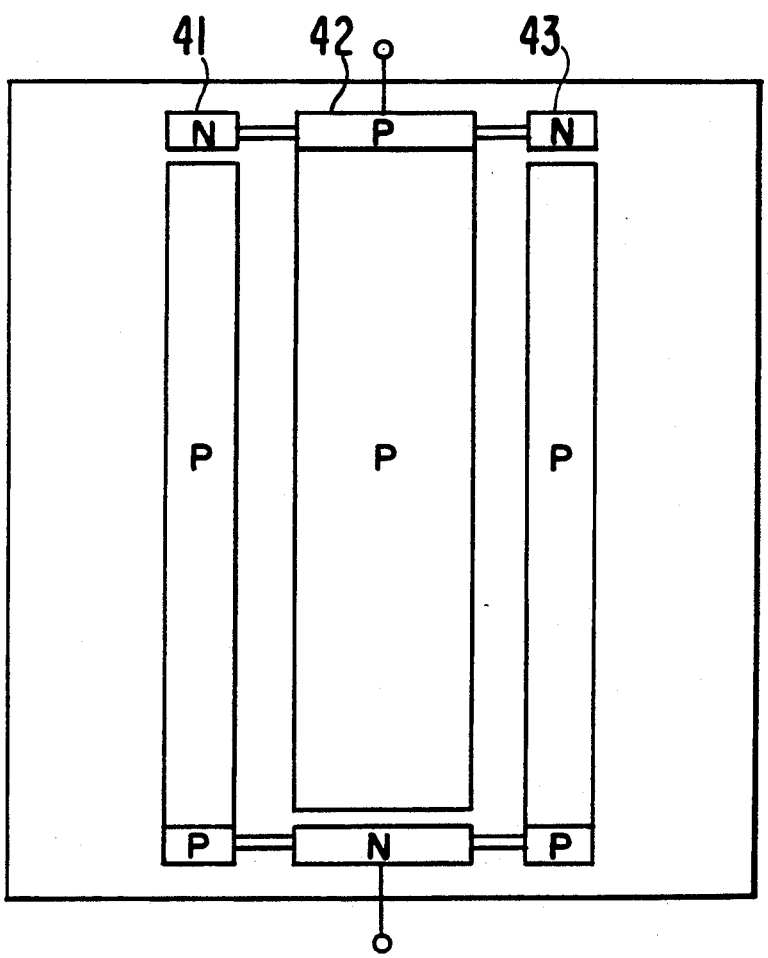
FIG. 9 shows the detector according to the invention in an embodiment made from discrete diodes.

This type of diode configuration can be made from discrete diodes 41,42,43 wired together in the same package as shown in FIG. 9. Alternately the diodes 41,42,43 could be formed on the same substrate 45, with additional dielectric isolation 44, as in FIG. 10 in which a typical PNN silicon diode construction is isolated by means of P channels.

Figure 11:
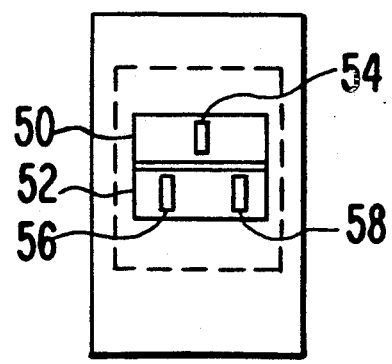
FIG. 11 shows a front view of an alternate embodiment in which two photodiodes are used with a slit mask having three openings.

Another alternate embodiment would include two diodes 50,52 and a slit mask with a configuration shown in FIG. 11 having three openings 54,56,58. The openings are arranged to provide diode 50 with signal radiation through opening 54 and to provide diode 52 with background radiation through openings 56,58 placed at wavelength slightly greater and slightly less than the signal wavelength. The areas of openings 56,58 together equals the area of opening 54.

This invention is not limited to the preferred embodiment and alternatives heretofore described, to which variations and improvements may be made, without departing form the scope of protection of the present patent and true spirit of the invention, the characteristics of which are summarized in the following claims.

What is claimed is:

1. In a gas chromatography apparatus having an optical spectrometer with photodetectors at fixed wavelengths, a photodetector comprising:
   a first means for detecting radiation at the fixed wavelength and for providing a first electrical signal as a function of radiation intensity;
   a second means for detecting radiation at a wavelength slightly greater than the fixed wavelength and for providing a second electrical signal as a function of radiation intensity;
   a third means for detecting radiation at a wavelength slightly less than the fixed wavelength and for providing a third electrical signal as a function of radiation intensity;
   said second and third means being connected in the same polarity so that said second and third electrical signals add to provide a summed electrical signal and said first means being connected in reverse polarity to said second means so that said summed electrical signal is subtracted from said first electrical signal, the efficiency of said first, second and third means being such that said first means provides twice as much electrical signal as said second means or said third means for the same amount of radiation.

2. The photodetector of claim 1 including:
   a main photodiode located at the fixed wavelength;
   a first background photodiode located adjacent to said main photodiode, said first photodiode being at a wavelength slightly greater than the fixed wavelength of said main photodiode, said first background photodiode having half the area of said main photodiode, said first background photodiode being wired in polarity reverse to said main photodiode;
   a second background photodiode located adjacent to said main photodiode, said second photodiode being at a wavelength slightly less than the fixed wavelength of said main photodiode, said second background photodiode having half the area of said main photodiode, said second background photodiode being wired in polarity reverse to said main photodiode.

3. The photodetector of claim 2 wherein said photodetectors are formed on a single substrate.

4. The photodetector of claim 1 including:
   a first photodiode;
   a second photodiode, said first and second diodes being connected together in reverse polarity;
   a mask placed in front of said photodiodes, said mask having three slits, a first slit being located in said mask so that the fixed wavelength of light strikes said first photodiode, a second slit being located in said mask so that light passing through said second slit falls on said second photodiode and so that the wavelength of light passed is slightly greater than said fixed wavelength, a third slit being located in said mask so that light passing through said third slit falls on said second photodiode and so that the wavelength of light passed is slightly less than said fixed wavelength, the areas of said second and third slits being each equal to half the area of said first slit.

* * * * *